UNITED STATES PATENT OFFICE.

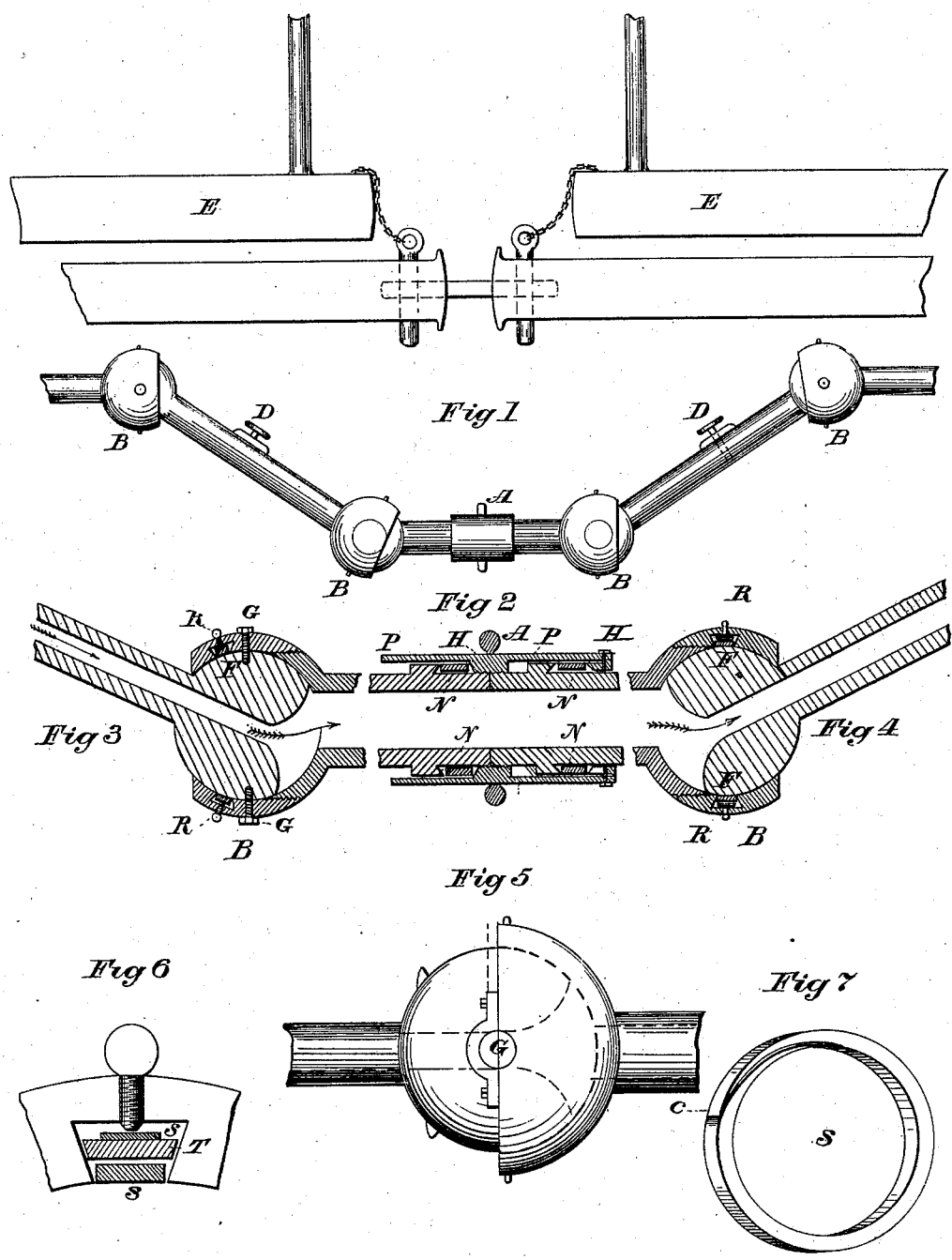

JAMES W. GRAYDON, OF WASHINGTON, DISTRICT OF COLUMBIA.

IMPROVEMENT IN CAR-HEATING APPARATUS.

Specification forming part of Letters Patent No. 203,611, dated May 14, 1878; application filed April 25, 1878.

*To all whom it may concern:*

Be it known that I, JAMES W. GRAYDON, of Washington, District of Columbia, have invented a new and Improved Apparatus for Heating Railroad-Cars; and I do hereby declare that the following is a full, clear, and exact description of the same.

My invention is designed to take hot water or hot air or steam from the locomotive and pass it through all the cars. The connection between the cars consists of flexible metal joints, made steam-tight by either a metal or hemp packing. Four ball-and-socket joints are used, together with a coupling, for connecting the ordinary pipes of two cars. A full description of one joint and the coupling will answer for the whole.

The ordinary ball-and-socket joint is used, together with either metal or hemp packing, fitting in the groove F, Figures 3 and 4. The packing is kept firmly pressed against the surface of the ball by means of ring-springs, the tension of which is regulated by screws R. The groove F is made with beveled edges, as represented in the drawing, so that as the screws R press the ring-spring onto the packing all the space in the groove nearest to the ball is filled with the packing, thereby preventing the escape of steam or hot water or hot air, but allowing the joint to work freely.

Fig. 3 is a representation of a ball-and-socket joint working on axles which are in the prolongation of one of its diameters.

The coupling A, Fig. 2, consists of a cylinder having a screw-thread cut on the inner circumference, together with grooves on either side of the screw-thread, the sides of which are beveled, as represented in the drawing. The grooves are filled with hemp and metal packing. The cylinder is screwed onto the ends of the pipes, and as it brings them together compresses and forces the hemp packing into the grooves, filling up the spaces, and thereby making the coupling steam or water or air tight.

It will be seen by the drawing that each groove is composed of one beveled side, H, on the coupling, and one, P, on the pipe; and as the coupling runs onto the thread of the pipes the sides of the grooves are drawn toward each other, thereby pressing the packing firmly against the surface of the pipes. The beveled side is made separate, and is secured to the cylinder by screws, as represented in the drawing. The steam to be used for heating purposes will be taken from the boiler direct, or will come from the exhaust side of the cylinder after the steam has completed the work of the engine; or, if water be used, it will be heated in the boiler of the engine, the train having complete circuit of pipes throughout, with a small pump on the engine to keep the water in motion throughout the cars. Hot water will then leave the boiler. The pump will force it throughout the circuit of pipes, returning it to the boiler.

Fig. 5 represents ball and half-socket joint fitted with axle G and journal J. The axle will take any strain that may come on the pipe. The metal packing is similar to the others used in the ball-and-socket joints. D D are stop-cocks, to be used in coupling and uncoupling.

Fig. 6 shows a section through socket-packing. S and S are the two metal ring-springs, and T is the rubber or hemp packing between the rings S and S.

Fig. 7 represents one of the metal rings with cut C C, as shown in the drawing.

What I claim is—

1. In an apparatus for heating railroad-cars, the flexible ball-and-socket joint, with groove-packing, ring-springs, and screws, substantially as specified.

2. The combination, with the two pipe-sections, having beveled shoulders P, of the coupling-cylinder A, having beveled shoulders H, and the packing held in the annular groove between said shoulders, as and for the purpose set forth.

3. In an apparatus for heating railroad-cars, the ball and half-socket joint fitted with axles and journals, substantially as specified.

JAMES W. GRAYDON.

Witnesses:
THOS. D. HODGKIN,
I. N. CAMPBELL.